United States Patent Office 3,279,987
Patented Oct. 18, 1966

3,279,987
PHENOTHIAZINE SUSPENSIONS
Donald E. Vierling, 53 Highland Road,
Bethel Park, Pa.
No Drawing. Filed Mar. 8, 1965, Ser. No. 438,074
6 Claims. (Cl. 167—53)

This invention relates to anthelmintics and more particularly to a new composition in the form of an aqueous phenothiazine suspension that is stable, free flowing and easily handled with the standard drench syringe.

This application is a continuation-in-part of my application Serial No. 252,065, filed January 17, 1963, entitled Composition of Matter and is now abandoned.

For many years phenothiazine and suspensions containing the same have been used as anthelmintics to control various internal parasites in all types of livestock. Since the phenothiazine suspensions which have been on the market contain approximately 40 percent by weight of phenothiazine, it can be determined that each fluid ounce thereof contains approximately 12½ grams of phenothiazine. Since a full therapeutic dosage for adult cattle is approximately 60 grams it is necessary to administer five fluid ounces of such suspensions to beef cattle and over two fluid ounces thereof to adult sheep which require 25 grams for a full therapeutic dose.

The prior art suspensions referred to essentially comprise water, phenothiazine and a dispersing agent. I have found that by employing a lignosulfonate in place of or in addition to said dispersing agent the amount of phenothiazine per fluid ounce in said suspensions may be greatly increased and in some cases doubled over similar suspensions which lack said lignosulfonate. At the same time the improved composition remains stable, free flowing and easily handled with the standard drench syringe.

The benefits to be derived from the improved composition defined and claimed herein are very substantial. Since each fluid ounce of the new and improved phenothiazine suspension will contain more phenothiazine than formerly, the volume of dosage administered to an animal can be correspondingly reduced, thus reducing shipping and storage space. In addition, I have found the anthelmintic efficiency of phenothiazine suspensions is also increased with increased concentration i.e. when each fluid ounce thereof contains additional phenothiazine. I attribute this to the fact that since phenothiazine is a contact drug, when it is administered to the animal in a more concentrated dose it passes through the abomasum and intestines in a more concentrated body and therefore has a greater opportunity of contacting the parasites than would be the case if the dosage were spread out over a greater area of the abomasum and intestines.

I have found that in addition to the improvmeents defined above, the new composition of matter defined and claimed herein not only maintains its excellent anthelmintic action against the parasites Haemonchus, Oesophagostomum and Bunostomum but, unexpectedly, exhibits excellent anthelmintic action against the parasites Trichostrongylus, Oestertagia and Cooperia.

In preparing the improved compositions of the present invention it is critical that the components thereof be carefully selected and be present within definite ranges which will be defined hereinafter.

Water, of course, is a necessary component and must be present within a range of about 25 to about 70 percent by weight, preferably within a range of about 30 to about 70 percent by weight, based on the final composition.

If desired a dispersing agent can be employed in the preparation of the improved composition of this invention. As a dispersing agent I can employ about 0.1 to about 2.5 percent by weight, preferably about 0.1 to about 0.6 percent by weight, based on the final composition, of such well-known dispersing agents as sodium alginate, gum karaya, bentonite clay, gelatin, sodium carboxymethyl cellulose, and tragacanth, or a silicon. By "silicone" I mean to include compounds referred to as such in my Patent No. 3,085,934, dated April 16, 1963. Of the various dispersing agents referred to immediately above I prefer to use either a bentonite clay or a silicone. The lignosulfonate which is employed in accordance with this invention will also facilitate dispersion of the phenothiazine but it will be seen that this is not its principal function.

Phenothiazine of a particle size which can be from about ¼ to about 15 microns, preferably from about 1 to about 7 microns, must be present in the amount of about 30 to about 75 percent by weight, preferably about 35 to about 70 percent by weight, based on the final composition.

As indicated above, the improvement in the utility and anthelmintic effectiveness of the composition of this invention is attributed largely to the role played by the presence therein of a suitable quantity of lignosulfonate. The quantity of lignosulfonate should be at least 0.1 percent by weight of the final liquid suspension and preferably at least 0.5 percent and the quantity need not exceed 3.5 percent by weight of the liquid suspension.

A lignosulfonate, as that term is used in this application, is a compound resulting from the sulfonation of natural lignin and, since this normally occurs in the pulping of wood by the sulfite process, there are a number of suppliers whose products have been found to function in the manner described herein.

Some of these satisfactory lignosulfonates are manufactured and sold by the Marathon Division of the American Can Company of Neenah, Wisconsin, under the name "Marasperses." According to Bulletin No. 130 published by them:

"The organic structure of lignosulfonate compounds has not been completely determined, but it is known that the basic lignin monomer unit is a substituted phenyl propane. A section of the polymeric lignosulfonic acid could have the following structure:

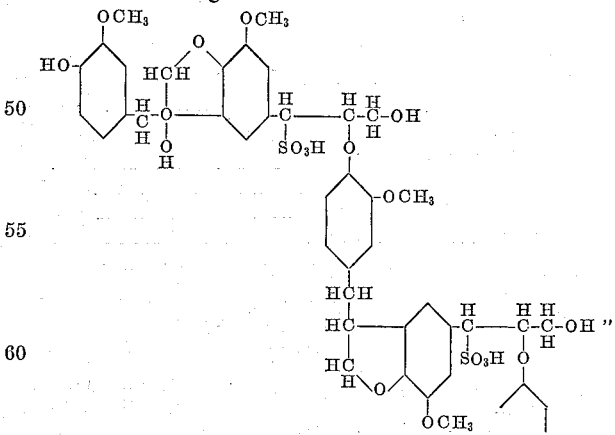

The lignosulfonates may have other structures than that suggested above. For a further discussion of the chemical structure of lignosulfonates reference is made to page 87 of the February 11, 1963, Chemical and Engineering News. In the July 6, 1964, issue of Chemical and Engineering News it is stated: "Although many investigators have attempted to define lignin in terms of its chemical structure, none have succeeded in proposing an adequate definition."

Notwithstanding the fact that a lignosulfonate cannot be specified with certainty in terms of its chemical formula, it has been found that a number of lignosulfonates from different suppliers are very effective when included in the composition of this invention.

If desired, materials added for a particular purpose, such as wetting agents, for example, dodecyl alcohol, polyvinyl alcohol, propylene glycol monolaurate, dodecyl benzene sulfonate, alcohol lauryl sulfonate, etc., and other materials, in an amount of about 0.1 to about 3.0 percent by weight, based upon the final composition, can also be incorporated in the new composition of this invention.

The new composition of matter can be prepared in any suitable manner which will assure proper admixture of the individual components thereof. Desirably, however, water having a temperature, for example, of about 40° to about 160° F., is initially placed in the vessel in which the composition is to be prepared. While stirring, the lignosulfonate defined above is added to the water at a temperature of about 40° to about 160° F. and a pressure of about 0 to about 10 pounds per square inch gauge. Mixing is continued for a period of about 10 to about 30 minutes, and then, if desired, a dispersing agent is added to the mixture at a temperature of about 40° to about 160° F. and a pressure of about 0 to about 10 pounds per square inch gauge. In a period of about 10 to about 30 minutes, while mixing, this phase ends and the phenothiazine is added thereto at a temperature of about 40° to about 160° F. and a pressure of about 0 to about 10 pounds per square inch gauge. After a mixing period of about one-half to about four hours the composition defined and claimed herein is obtained.

The teachings of the present invention may be further illustrated by the following examples, I through VIII, where, in each instance, the lignosulfonate employed was Marasperse CE. The lignosulfonate was, in each example, added to 250 pounds of water having a temperature of 125° F. and subjected to mixing in a tank, at atmospheric pressure, using a high speed (i.e. 1750 r.p.m.) agitator of approximately five horsepower.

After 15 minutes of agitation, selected amounts of dispersing agent, bentonite or silicone, were added where indicated to the mixture. Agitation was continued for an additional 15 minutes. The required amount of phenothiazine was then added. Agitation was then continued for about one hour in order to mix the slurry thoroughly and obtain the desired viscosity. The compositions obtained are described immediately hereinafter. In each of the foregoing examples, the particle size of the phenothiazine or bentonite in microns is the average particle size as determined by a Fischer Subsieve Sizer.

*Example I*

Ingredients: Amount by weight, percent
Phenothiazine (6 microns) _____ 71.2
Lignosulfonate _____ 2.8
Bentonite clay (6 microns) _____ 0.1
Water _____ 25.9

This composition contained 71.2 percent by weight of phenothiazine, which is equivalent to 25 grams of phenothiazine per fluid ounce of suspension.

*Example II*

Ingredients: Amount by weight, percent
Phenothiazine (6 microns) _____ 55.0
Lignosulfonate _____ 1.1
Methylpolysiloxane _____ 0.6
Water _____ 43.3

The methylpolysiloxane employed was one identified as F-1, obtained from Hadag Chemical Corporation (7247 North Central Park, Chicago 45, Illinois) having the following physical properties: weight per gallon 8.3–8.4 pounds; specific gravity at 25° C. 0.99–1.0; viscosity at 25° C. 325 centistokes; pour point −30° F.; flash point above 600° F.; soluble in amyl acetate, aromatic solvents, 2-ethylhexanol and kerosene; and insoluble in water, paraffin oil, glycols, ethanol, methanol and glycerine. This composition contained 55 per cent by weight of phenothiazine, which is equivalent to 20 grams of phenothiazine per fluid ounce of suspension.

*Example III*

Ingredients: Amount by weight, percent
Phenothiazine (1:5 microns) _____ 45.6
Lignosulfonate _____ 0.5
Bentonite clay (6 microns) _____ 2.3
Water _____ 51.6

The composition contained 45.6 percent by weight of phenothiazine, which is equivalent to 15 grams of phenothiazine per fluid ounce of suspension.

*Example IV*

Ingredients: Amount by weight, percent
Phenothiazine (3 microns) _____ 54.8
Lignosulfonate _____ 1.2
Methylpolysiloxane _____ 0.4
Water _____ 43.6

The methylpolysiloxane of Example IV was similar to that employed in Example II. This composition contained 54.8 percent by weight of phenothiazine, which is equivalent to 20 grams of phenothiazine per fluid ounce of suspension.

*Example V*

Ingredients: Amount by weight, percent
Phenothiazine (6 microns) _____ 30.93
Lignosulfonate _____ 0.73
Bentonite clay (6 microns) _____ 3.10
Water _____ 65.24

This composition contained 30.93 per cent phenothiazine by weight which is equivalent to 10 grams of phenothiazine per fluid ounce.

*Example VI*

Ingredients: Amount by weight, percent
Phenothiazine (1 micron) _____ 46.24
Lignosulfonate _____ 2.04
Water _____ 51.72

This composition contained 46.24 percent phenothiazine by weight which is equivalent to 15 grams of phenothiazine per fluid ounce.

*Example VII*

Ingredients: Amount by weight, percent
Phenothiazine (1 micron) _____ 31.57
Lignosulfonate _____ 1.27
Water _____ 67.16

This composition contained 31.57 percent phenothiazine by weight which is equivalent to 10 grams of phenothiazine per fluid ounce.

*Example VIII*

Ingredients: Amount by weight, percent
Phenothiazine (6 microns) _____ 71.05
Lignosulfonate _____ 2.73
Water _____ 26.22

This composition contained 71.05 per cent phenothiazine by weight which is equivalent to 25 grams of phenothiazine per fluid ounce.

As pointed out above the new compositions of the present invention produce a substantial increase in anthelmintic action over the compositions of the prior art.

Compositions A and C, similar to the prior art compositions, were prepared in using the same procedure as described above, except that the lignosulfonate polymer was not employed. In Composition A, 244 pounds of water, 11 pounds of bentonite and 150 pounds of seven micron phenothiazine were employed. In Composition C, 130 pounds of water, six pounds of bentonite and 65 pounds of six micron phenothiazine were employed. Compositions B and D were also prepared according to the same procedure but using lignosulfonate. Composition B contained 25.9 pounds of water, 2.8 pounds of Marasperse CE, 0.1 pound of bentonite and 71.2 pounds of seven micron phenothiazine. Composition D contained 43.3 pounds of water, 1.1 pounds of Marasperse CE, 0.6 pound of methylpolysiloxane and 55 pounds of six micron phenothiazine. Each of Compositions A, B, C and D was applied in the form of a drench slurry to cattle. The results obtained are set forth below in Table I.

sites which were mainly Haemonchus, Trichostrongylus and Oestertagia, by 97.3%.

The anthelmintic efficiency of the composition of Example VI against the major internal parasites of sheep is:

Haemonchus—100%; Trichostrongylus—96%; Oesophagostomum—99%; Oestertagia—97%; Cooperia—95%; and Bunostomum—99%.

Again it is noted that the improved composition of this invention was extremely effective in reducing the internal parasite infection in sheep and cattle.

That the presence of the lignosulfonate in the claimed composition is critical is apparent from a consideration of Example IX below.

*Example IX*

Several compositions of matter were prepared, each containing 37.25 percent by weight of Phenothiazine NF Table 1

| Composition Employed | Amount of Phenothiazine Administered, Grams | Type of Animal Tested and Weight in Pounds | Anthelmintic Efficiency | | Percent Reduction | |
|---|---|---|---|---|---|---|
| | | | Parasite Eggs Per Gram Prior to Treatment | Parasite Eggs Per Gram 14 Days After Treatment | | |
| A. (12½ grams phenothiazine per fluid ounce) | 25 | Sheep, 62 | 683 | 110 | 84 | Average 84.5%. |
| | 25 | Sheep, 68 | 940 | 122 | 87 | |
| | 25 | Sheep, 73 | 450 | 81 | 82 | |
| | 25 | Sheep, 82 | 1,130 | 158 | 86 | |
| | 25 | Sheep, 71 | 1,015 | 162 | 84 | |
| | 25 | Sheep, 69 | 1,632 | 242 | 85 | |
| B. (25 grams phenothiazine per fluid ounce)[1] | 25 | Sheep, 68 | 747 | 82 | 89 | Average 92.5%. |
| | 25 | Sheep, 63 | 820 | 65 | 92 | |
| | 25 | Sheep, 72 | 640 | 57 | 91 | |
| | 25 | Sheep, 78 | 380 | 16 | 96 | |
| | 25 | Sheep, 86 | 415 | 29 | 93 | |
| | 25 | Sheep, 83 | 1,085 | 55 | 95 | |
| C. (10 grams phenothiazine per fluid ounce) | 60 | Cow, 485 | 1,620 | 270 | 83 | Average 82%. |
| | 60 | Cow, 434 | 1,785 | 255 | 86 | |
| | 60 | Cow, 416 | 1,120 | 213 | 81 | |
| | 60 | Cow, 481 | 980 | 205 | 79 | |
| | 60 | Cow, 474 | 1,492 | 298 | 80 | |
| | 60 | Cow, 462 | 2,135 | 364 | 83 | |
| D. (20 grams phenothiazine per fluid ounce)[2] | 60 | Cow, 492 | 2,165 | 145 | 93 | Average 92.5%. |
| | 60 | Cow, 514 | 2,740 | 245 | 91 | |
| | 60 | Cow, 487 | 1,632 | 161 | 90 | |
| | 60 | Cow, 493 | 840 | 53 | 94 | |
| | 60 | Cow, 481 | 1,120 | 47 | 96 | |
| | 60 | Cow, 489 | 920 | 74 | 92 | |

[1] Prepared as per Example I.
[2] Prepared as per Example II.

The data in Table I clearly show that when sheep were treated with 25 grams of phenothiazine of a suspension conforming to the prior art but containing 12¼ grams of phenothiazine per fluid ounce, the anthelmintic efficiency was about 84 percent. When the sheep were treated with a suspension which conforms to the teachings of the present invention and containing 25 grams of phenothiazine per fluid ounce, the anthelmintic efficiency was about 92 percent. Similarly, cows treated with 60 grams of phenothiazine in a prior art solution and containing 10 grams of phenothiazine per fluid ounce the anthelmintic efficiency was 82 percent. However, the anthelmintic efficiency was raised to about 92 percent when the same amount of phenothiazine was given to cows in a composition which conforms to the teaching herein and which contains 20 grams of phenothiazine per fluid ounce.

The composition of Example VI was administered to 10 sheep weighing an average of 58 pounds each, at the rate of 25 grams of phenothiazine per sheep, and reduced the internal parasites which were mainly Haemonchus, Trichostrongylus and Oestertagia, by 98.4%.

The composition of Example VI was administered to 10 cows weighing an average of 510 pounds each, at the rate of 60 grams per cow, and reduced the internal para- (six micron average), 2.70 percent by weight of bentonite clay, 36.25 percent by weight of water and one percent by weight of a lignosulfonate (Marasperse CE) or, in lieu thereof, an equivalent amount of a selected wetting and/or dispersing agent or water. Each of the compositions was prepared in accordance with the procedure employed in preparing the compositions of Examples I, II, III and IV, and each composition was formulated so that each fluid ounce of suspension contained 12½ grams of phenothiazine. The compositions prepared are designated below.

Designation of Composition: Includes one percent by weight of—
A _____ Lignosulfonate (Marasperse CE).
B _____ Sodium lauryl sulfate.
C _____ Sodium dodecyl benzine sulfonate.
D _____ Sodium tetradecyl sulfate.
E _____ Polyoxyethylene ether.
F _____ Sodium algenate.
G _____ Triethanolamine.
H _____ Water.

Each of the compositions identified immediately above was applied in the form of a drench slurry to sheep and cows. The results obtained are tabulated below in Table II.

treatment with phenothiazine or the phenothiazine Marasperse CE polymer. Note from the data in Table

Table II

| Composition | Type of Animal Tested | No. of Such Animals Tested | Average Weight of Animal | Amount of Phenothiazine Administered Per Animal, Grams | Anthelmintic Efficiency, Percent Reduction |
|---|---|---|---|---|---|
| A | Sheep | 10 | 67 | 25 | 96.1 |
| A | Cows | 10 | 493 | 60 | 95.7 |
| B | Sheep | 10 | 63 | 25 | 85.2 |
| B | Cows | 10 | 454 | 60 | 83.6 |
| C | Sheep | 10 | 59 | 25 | 84.4 |
| C | Cows | 10 | 467 | 60 | 84.8 |
| D | Sheep | 10 | 58 | 25 | 83.5 |
| D | Cows | 10 | 498 | 60 | 82.3 |
| E | Sheep | 10 | 69 | 25 | 85.7 |
| E | Cows | 10 | 461 | 60 | 83.1 |
| F | Sheep | 10 | 63 | 25 | 85.8 |
| F | Cows | 10 | 468 | 60 | 83.1 |
| G | Sheep | 10 | 58 | 25 | 85.2 |
| G | Cows | 10 | 471 | 60 | 83.4 |
| H | Sheep | 10 | 67 | 25 | 84.8 |
| H | Cows | 10 | 487 | 60 | 82.6 |

The anthelmintic efficiency of this and all similar tests set forth in this application was determined by the percent reduction of internal parasites, which were mainly Haemonchus, Trichostronglyus and Ostertagia. This was done by comparing the parasite eggs per gram prior to the treatment and the parasite eggs per gram 14 days after treatment.

The data in Table II show that there was at least a reduction of 95.7 percent in egg count when the composition defined and claimed herein was administered to animals, but no more than a reduction of 85.8 percent in egg content when a composition identical thereto but containing a wetting and/or dispersing agent or water in lieu of the defined lignosulfonate polymer was employed for the same purpose.

Example X

In order to show that the composition defined and claimed herein is extremely effective against the parasites Haemonchus, Oesophagostomum and Bunostomum tests were run on a flock of 30 sheep divided into two lots of fifteen sheep each having an average weight of seventy to eighty pounds per sheep per group. One group of fifteen sheep was treated with 25 grams per sheep of six micron phenothiazine NF. The other group of fifteen was treated with a composition, such as defined in Example IX, consisting of 25 grams per sheep of a composition containing six micron phenothiazine and one percent by weight of the lignosulfonate polymer, Marasperse CE (Lignin Pitch). The results obtained are tabulated below in Table III.

Table III

| Internal Parasite | Anthelmintic Efficiency | |
|---|---|---|
| | Phenothiazine NF, Six Microns, Percent | Phenothiazine NF, Six Microns With Marasperse CE, Percent |
| Haemonchus | 99 | 100 |
| Trichostrongylus | 82 | 93 |
| Oesophagostomum | 98 | 98 |
| Ostertagia | 81 | 92 |
| Cooperia | 63 | 90 |
| Bunostomum | 92 | 98 |

The anthelmintic efficiency above was determined by comparing the internal parasite eggs per gram in the feces before treatment with phenothiazine and 14 days after III that the composition defined and claimed herein was as good or better than phenothiazine alone against the parasites Haemonchus and Oesophagostomum and appreciably better against the parasite Bunostomum. The composition of this invention, however, had unexpected, increased anthelmintic action against the parasites Trichostrongylus, Ostertagia and Cooperia.

Example XI

Additional tests were run on a herd of 20 cattle divided into two groups of ten each, having a weight of from 360 to 410 pounds per animal. One group of ten cows was treated with 60 grams of six micron phenothiazine NF per animal. The other group was treated with a composition, such as defined in Example IX, consisting of 60 grams per sheep of a composition containing six micron phenothiazine and one percent of the lignosulfonate polymer, Marasperse CE. The results obtained are tabulated below in Table IV.

Table IV

| Internal Parasite | Anthelmintic Efficiency | |
|---|---|---|
| | Phenothiazine NF, Six Microns, Percent | Phenothiazine NF, Six Microns With Marasperse CE, Percent |
| Haemonchus | 99 | 99 |
| Trichostrongylus | 79 | 89 |
| Oesophagostomum | 99 | 99 |
| Ostertagia | 77 | 91 |
| Cooperia | 68 | 87 |
| Bunostomum | 89 | 94 |

Anthelmintic efficiency was determined as defined in Example IX. Note that again the composition of this invention was as good as phenothiazine alone against the parasites Haemonchus and Oesophagostomum and appreciably better against the parasite Bunostomum. Again the composition of this invention had unexpected, increased anthelmintic action against the parasites Trichostrongylus, Ostertagia and Cooperia.

With respect to the choice of lignosulfonates, it is not felt that the specification should be limited except that the lignosulfonate should be substantially as water soluble as the Maraperse CE used in the example mentioned above. Some of the other lignosulfonates are more soluble, but all of the lignosulfonates that we have used are sufficiently soluble considering the amount of water that is used. The Marasperse CE used in the above examples has been obtained in the form of a relatively dry powder, whereas a number of the other lignosulfonates have been obtained from suppliers in liquid form, i.e. in solution. In listing below, in Table V, the sources of some of the other lignosulfonates and the results achieved, we have in each case indicated the amount of lignosulfonate used on the basis of the percent of lignosulfonate in the sample as specified by the supplier. Column 2, of Table V, lists the amount of the lignosulfonate required to make a satisfactory and stable 20 gram per fluid ounce suspension and this amount varies from 1.1% to 1.4% by weight of the various lignosulfonates. Columns 3 and 4 show the effectiveness of drench suspensions containing 12½ grams of phenothiazine per fluid ounce and containing 1% by weight of lignosulfonate prepared as per Example IX and it will be noted that the results compare favorably with Composition A in that example and that the anthelmintic efficiency was in each case clearly superior to the same type of phenothiazine suspension which did not employ the lignosulfonate.

Table V

| Source of Lignosulfonate Used | Amount used to Make a Suspension Containing 20 Grams of Phenothiazine per Fluid Ounce, Percent by Weight | Effectiveness of a Drench Suspension Prepared as per Example IX and Containing 12½ Grams Phenothiazine per Fluid Ounce and 1% by Weight of the Lignosulfonate | |
|---|---|---|---|
| (Col. 1) | (Col. 2) | (Col. 3) | (Col. 4) |
| | | Sheet, Percent | Cattle, Percent |
| St. Regis Paper Co., New York, N.Y. | 1.1 | 93.2 | 91.8 |
| Penobscot Chemical Fibre Co., Great Works, Me. | 1.3 | 92.3 | 93.4 |
| International Paper Company, New York, N.Y. | 1.1 | 94.6 | 93.8 |
| West Virginia Pulp and Paper, New York, N.Y. | 1.4 | 94.1 | 93.1 |
| Marathon Company (Marasperse C), Neenah, Wisconsin | 1.1 | 92.6 | 92.7 |
| Marathon Company (Marasperse N), Neenah, Wisconsin | 1.1 | 95.3 | 94.7 |

In conclusion, it should be emphasized that the addition of lignosulfonate has surprisingly beneficial effects, even when the concentration of phenothiazine is not increased. Evidently, the combination of phenothiazine and lignosulfate gives synergistic and unexpected results in worming animals. Not only does the lignosulfonate make it possible to add an increased amount of phenothiazine while maintaining a viscosity which will enable the drench suspension to be easily administered by the standard drench syringe but, at the same time, when a comparison is made at the same concentration of phenothiazine increased anthelmintic efficiency is pronounced when the lignosulfonate is used.

It is manifest that variations and modifications of the present invention can be made without departing from the spirit and scope thereof and accordingly only such limitations should be imposed as are indicated in the appended claims.

I claim:

1. A composition of matter comprising a suspension containing about 30 to about 75 percent by weight of phenothiazine having a particle size of about ¼ to about 15 microns, about 25 to about 70 percent by weight of water and about 0.1 to about 3.5 percent by weight of a lignosulfonate.

2. A composition of matter comprising a suspension containing about 30 to about 75 percent by weight of phenothiazine having a particle size of about ¼ to about 15 microns, about 0.1 to about 2.5 percent by weight of a dispersing agent, about 25 to about 70 percent by weight of water and about 0.1 to about 3.5 percent by weight of a lignosulfonate.

3. A composition of matter comprising a suspension containing about 30 to about 75 percent by weight of phenothiazine having a particle size of about ¼ to about 15 microns, about 0.1 to about 2.5 percent by weight of bentonite clay, about 25 to about 70 percent by weight of water and about 0.1 to about 3.5 percent by weight of a lignosulfonate.

4. A composition of matter comprising a suspension containing about 30 to about 75 percent by weight of phenothiazine having a particle size of about ¼ to about 15 microns, about 0.1 to about 2.5 percent by weight of a silicone, about 25 to about 70 percent by weight of water and about 0.1 to about 3.5 percent by weight of a lignosulfonate.

5. A composition of matter comprising a suspension containing about 30 to about 75 percent by weight of phenothiazine having a particle size of about ¼ to about 15 microns, about 0.1 to about 2.5 percent by weight of a methylpolysiloxane, about 25 to about 70 percent by weight of water and about 0.1 to about 3.5 percent by weight of a lignosulfonate.

6. A composition of matter comprising a suspension containing about 30 to 75 percent by weight of phenothiazine having a particle size of about ¼ to about 15 microns, about 25 to 70 percent by weight of water and at least about 0.1 percent by weight of a lignosulfonate.

References Cited by the Examiner

UNITED STATES PATENTS 3,085,934   4/1963   Vierling _____ 167—53

OTHER REFERENCES

Schwartz, Surface Active Agents and Detergents, vol. II, 1958, Interscience Publishers, Inc., New York, New York, pages 100–102.

JULIAN S. LEVITT, *Primary Examiner.*

SAM ROSEN, *Assistant Examiner.*